United States Patent
Das et al.

[11] Patent Number: 5,849,835
[45] Date of Patent: Dec. 15, 1998

[54] POLYISOCYANATE CURED ULTRADURABLE GLOSSY COATING COMPOSITIONS

[75] Inventors: Suryya K. Das, Fox Chapel Borough; Soner Kilic, Hampton Twp.; Andrew J. Lauer, Westmoreland County, all of Pa.

[73] Assignee: PPG Industries, Inc., Pittsburgh, Pa.

[21] Appl. No.: 574,825

[22] Filed: Dec. 19, 1995

[51] Int. Cl.$^6$ ............................... C08J 3/20; C08K 3/20; C08L 75/00; C08F 8/30
[52] U.S. Cl. .................. 524/590; 525/123; 525/124; 525/440; 525/455
[58] Field of Search .................. 525/123, 124, 525/440, 455; 524/590

[56] References Cited

U.S. PATENT DOCUMENTS

| | | | |
|---|---|---|---|
| 4,345,057 | 8/1982 | Yamabe et al. | 526/247 |
| 4,565,730 | 1/1986 | Poth et al. | 428/204 |
| 5,279,862 | 1/1994 | Corcoran et al. | 427/407.1 |
| 5,445,850 | 8/1995 | Das et al. | 427/407.1 |

FOREIGN PATENT DOCUMENTS

| | | |
|---|---|---|
| 337 744 | 10/1989 | European Pat. Off. . |
| 676 423 A1 | 4/1994 | European Pat. Off. . |
| WO 94/22969 | 3/1994 | Germany . |
| 44 07 415 A1 | 9/1995 | Germany . |
| 58-017174 | 2/1983 | Japan . |
| 63-142009 | 6/1988 | Japan . |
| WO94/09916 | 5/1994 | WIPO . |

*Primary Examiner*—Patrick D. Niland
*Attorney, Agent, or Firm*—Paul S. Chirgott

[57] ABSTRACT

A curable, film-forming composition is provided which includes: (a) a hydroxyl-containing acrylic solution polymer, and (b) a polyisocyanate crosslinking agent. The hydroxyl-containing acrylic solution polymer is present in an amount ranging from between about 60 to about 90 weight percent; and, the polyisocyanate crosslinking agent is present in an amount ranging from between about 10 to about 40 weight percent. The acrylic solution polymer is the reaction product of: (a) a cycloaliphatic and/or aromatic ester of (meth)acrylic acid having at least 6 carbon atoms in the cycloaliphatic and/or aromatic group, and (b) a hydroxyl functional acrylic monomer component. The hydroxyl functional acrylic monomer component is present in an amount such that the hydroxyl number of the resulting acrylic solution polymer is less than 60. This invention also provides a color-plus-clear coating system. This system includes: (a) applying a film-forming base coat onto a substrate, and (b) applying a clear, film-forming topcoat over the base coat. The clear topcoat includes the curable, film-forming composition described above.

20 Claims, No Drawings

POLYISOCYANATE CURED ULTRADURABLE GLOSSY COATING COMPOSITIONS

FIELD OF THE INVENTION

The present invention relates to polyisocyanate-curable, film-forming compositions, and processes for preparing multi-layered coated articles comprising a pigmented or colored base coat and a clear topcoat.

BACKGROUND OF THE INVENTION

Color-plus-clear coating systems have become conventional as original finishes for automobiles. These systems typically involve the application of a pigmented base coat to a substrate. This is followed by the application of a clear topcoat over the base coat. These color-plus-clear systems have outstanding gloss and distinctness of image, most of which is provided by the clear topcoat.

In addition to having a high gloss, it is often desirable for the clear topcoat in this color-plus-clear system to be ultradurable and acid etch resistant. As used herein, the term "ultradurable" refers to the ability of the topcoat to retain a large percentage of its original gloss when exposed to environmental conditions such as rain, sun, heat, freezing temperatures, and the like.

Coating systems which are known to be durable are described in U.S. Pat. No. 4,565,730. That Patent describes coating compositions which contain as binders a combination of two specific hydroxyl-containing acrylate resins and an aliphatic and/or cycloaliphatic polyisocyanate or a mixture of such polyisocyanates. The hydroxyl number of the first of the two specific acrylic polymers ranges from between 80 to 180 and is present in an amount ranging from between 50 to 90% by weight, based on total acrylic polymers. The hydroxyl number of the second of the two specific acrylic polymers ranges from between 40 to 120 and is present in an amount ranging from between 10 to 50% by weight, based on total acrylic polymers.

In the past, it was believed that, in order to make coatings ultradurable, it is necessary for the polymers to contain fluoroine. However, while coatings based on polyvinylidene difluoride are ultradurable, they do not have a high gloss.

Notwithstanding the above, the fluoropolymers described in U.S. Pat. No. 4,345,057. have a high gloss and are ultradurable. The fluoropolymers described in that Patent are based on chlorotrifluoroethylene, vinyl ethers and hydroxy functionality to facilitate curing with polyisocyanates. However, these fluoropolymers are very expensive. Moreover, there is special equipment required to work with these gaseous monomers.

Processes for applying a double-layered covering lacquer on the surface of a substrate are disclosed in International (PCT) Application WO 94/22969. This PCT Application discloses processes which use a transparent covering lacquer containing a hydroxyl group-containing polyacrylate resin produced by polymerizing: (a) 10 to 51% by weight, preferably 25 to 41% by weight, of 4-hydroxy-n-butylacrylate or 4-hydroxy-n-butylmethacrylate, or a mixture thereof, and (b) 28 to 85% by weight, preferably 40 to 70% by weight, of an aliphatic or cycloaliphatic ester of methacrylic acid with at least 4 carbon atoms in the alcohol radical which is different from (a), above. The resulting polyacrylate resin has a hydroxyl number ranging from between 60 to 200, preferably, from between 100 to 160.

Commonly-owned U.S. Pat. No. 5,445,850 is entitled "Aminoplast Cured Acid Etch Resistant Coating with Good Durability." That Patent discloses coating compositions and their use in color-plus-clear coating systems. These coating compositions include acrylic polymers prepared with high levels of cycloaliphatic or aromatic ester of acrylic and methacrylic acid and hydroxypropyl- or hydroxybutyl acrylates and methacrylates and aminoplast crosslinking agents.

SUMMARY OF THE INVENTION

It is one object of this invention to provide a novel high gloss clear coating composition which is ultradurable and resists acid etching.

Another object of this invention is to provide a color-plus-clear coating system which includes a novel clear, high gloss topcoat which is ultradurable and resists acid etching.

These and other objects are achieved by the discovery of novel coating compositions which can be used as a clear top coat of a color-plus-clear coating system. In accordance with the present invention, a curable film-forming composition is provided which includes: (a) a hydroxyl-containing acrylic solution polymer, and (b) a polyisocyanate crosslinking agent. The hydroxyl-containing acrylic solution polymer is present in an amount ranging from between about 60 to about 90 weight percent; and, the polyisocyanate crosslinking agent is present in an amount ranging from between about 10 to about 40 weight percent. These weight percentages are based upon the total resin solids of the hydroxyl-containing acrylic solution polymer and the polyisocyanate crosslinking agent, respectively, in the film forming composition.

The acrylic solution polymer is the reaction product of: (a) a cycloaliphatic and/or aromatic ester of acrylic acid or methacrylic acid (hereinafter referred to as "(meth)acrylic acid") having at least 6 carbon atoms in the cycloaliphatic and/or aromatic group, and (b) a hydroxyl functional acrylic monomer component. The cycloaliphatic and/or aromatic ester component is typically employed in an amount ranging from between about 45 to about 95 weight percent. Moreover, the hydroxyl functional acrylic monomer component is present in an amount such that the hydroxyl number of the resulting acrylic solution polymer is less than 60. It has been discovered that the coating compositions made in accordance with the present invention are not only ultradurable, but also acid etch resistant.

This invention also provides a process for applying a composite coating onto a substrate. This process includes: (a) applying a film-forming base coat onto a substrate, (b) at least partially curing the base coat, and (c) applying a clear, film-forming top coat over the at least partially cured base coat. The clear top coat being applied over the base coat includes the curable, film-forming composition described above.

These and other aspects and advantages of this invention will become apparent to those skilled in the art upon reading the following Detailed Description.

DETAILED DESCRIPTION

The present invention pertains to the development of a novel, crosslinkable film-forming composition which has a high gloss, is ultradurable and resists acid etching. This film-forming composition includes: (a) a hydroxyl-containing acrylic solution polymer, and (b) a polyisocyanate crosslinking agent.

As used herein, the term "acrylic solution polymer" means that the acrylic polymer is prepared by solution polymerization techniques while in the presence of suitable initiators such as organic peroxides or azo compounds (e.g., benzoyl peroxide or 2,2'-azobis(2-methylbutanenitrile)). This polymerization can be carried out in an organic solvent in a conventional manner in which the monomers and polymers produced are soluble.

When practicing this invention, the acrylic solution polymer is typically present in the film-forming composition in an amount ranging from between about 60 to about 90 weight percent, and preferably, from between about 70 to about 85 weight percent. These weight percentages are based upon the total resin solids weight of a hydroxyl-containing acrylic solution polymer in the film-forming composition. On the other hand, the polyisocyanate crosslinking agent is typically present in the film-forming composition in an amount ranging from between about 10 to about 40 weight percent, and preferably, from between about 15 to about 30 weight percent. These weight percentages are based upon the total resin solids weight of an polyisocyanate crosslinking agent in the film-forming composition.

The acrylic solution polymer is the reaction product of: (a) a cycloaliphatic and/or aromatic ester of (meth)acrylic acid having at least 6 carbon atoms in the cycloaliphatic and/or aromatic group, and (b) a hydroxyl functional acrylic monomer component. The hydroxyl functional acrylic monomer component is present in an amount such that the hydroxyl number of the resulting acrylic solution polymer is less than 60. The cycloaliphatic or aromatic ester component is typically employed in an amount ranging from between about 45 to about 95 weight percent, and preferably, from between about 60 to about 90 weight percent. These weight percentages are based upon total weight of monomers used in preparing the acrylic solution polymer. Moreover, although the cycloaliphatic or aromatic ester component has at least 6 carbon atoms in the cycloaliphatic or aromatic group, typically, it has from between 6 to 12 carbon atoms. Examples of such compounds which can be used when practicing this invention include: benzyl methacrylate, phenyl methacrylate, t-butyl-cyclohexyl methacrylate and cyclohexyl methacrylate or mixtures thereof. Cyclohexyl methacrylate is preferred.

On the other hand, the hydroxyl functional acrylic monomer component is typically employed in an amount such that the hydroxyl number of the resulting acrylic solution polymer is less than 60. Preferably, the amount of the hydroxyl functional acrylic monomer component employed is such that the acrylic solution polymer's hydroxyl number is in the range from between about 25 to about 55, and more preferably, from between about 30 to about 55. Any suitable hydroxyl functional monomer, or combination thereof, can be used when practicing this invention. Examples of such suitable monomers include: hydroxyethyl acrylate, hydroxyethyl methacrylate, 2-hydroxypropyl acrylate, 2-hydroxypropyl methacrylate, 2- and 4-hydroxybutyl acrylate, and 2- and 4-hydroxybutyl methacrylate or mixtures thereof. The hydroxyl functional monomers most preferred for providing acid etch resistance are 2-hydroxybutyl acrylate and 2-hydroxypropyl acrylate.

The acrylic solution polymer may further include up to 45 weight percent of a monomer(s) such as vinyl aromatic compounds and alkyl acrylates and methacrylates which contain from 1 to 8 carbon atoms in the alkyl group. This weight percent is based upon total weight of monomers used in preparing the acrylic solution polymer. Suitable vinyl aromatic compounds which can be used include: styrene and vinyl toluene. Styrene is preferred. Suitable alkyl acrylates and methacrylates which can be used include: methyl methacrylate, ethyl methacrylate, n-butyl methacrylate, ethyl acrylate, n-butyl acrylate, and 2-ethylhexyl acrylate. A mixture of n-butyl acrylate and methyl methacrylate is preferred.

The acrylic solution polymer typically has a number average molecular weight ranging from between about 1,000 to about 30,000, and preferably, from -between about 1,500 to 20,000. These molecular weights are determined by gel permeation chromatography using polystyrene as standard.

The crosslinking agent can be any one or more polyisocyanate(s) which can be used in organic solvents. Examples of polyisocyanates which can be used when practicing this invention include: toluene diisocyanates, isocyanurates of toluene diisocyanate, diphenylmethane 4,4-'diisocyanate, isocyanurates of 4,4'-diisocyanate, 1,4-cyclohexane diisocyanate, p-phenylene diisocyanate, triphenylmethane 4,4',4"-triiocyanate, metaxylene diisocyanate and polyisocyanates, 1,6-hexamethylene diisocyanate, isocyanurates of 1,6-hexamethylene diisocyanate, isophorone diisocyanate, isocyanurates of isophorone diisocyanate, methylene bis-4,4'-isocyanatocyclohexane, and 1,3-bis-(2-isocyanate propyl-2-)benzene (TMXDI), as well as adducts of these polyisocyanates on polyols, especially low molecular weight polyols (e.g., trimethylol propane) and isocyanurate group-containing and/or biuret group-containing polyisocyanates derived therefrom. As polyisocyanates, preferred use is made of 1,6-hexamethylene diisocyanate and isophorone diisocyanate, isocyanurate- and/or biuret-containing polyisocyanates which are derived from the latter and which preferably contain more than 2 isocyanate groups in the molecule.

The polyisocyanates used when practicing this invention can be both in free and in blocked form. If the polyisocyanate being employed is in a blocked form, any blocking agent can be used, provided that the agent has a sufficiently low deblocking temperature.

Groups suitable for use as the blocker portion of a blocked isocyanate are also well-known in the art. Examples of such suitable groups include: alcohols, lactams, oximes, malonic esters, alkyl acetoacetates, triazoles, phenols and amines. Of these, oximes (e.g., acetone oxime, methyl ethyl ketoxime, methyl amyl ketoxime, diisobutyl ketoxime, formaldehyde oxime) are preferred.

In a preferred embodiment of the present invention, the film-forming composition contains a catalyst to accelerate the cure of the polyisocyanate and other -crosslinkable groups. Examples of useful catalysts include: metal acetonyl acetates, quaternary ammonium salts, zinc N-ethyl-N-phenyl dithiocarbamate, pentamethyl-diethylenetriamine benzoate, cyclohexylamine acetate, n,n-dimethyl cyclohexylamine acetate, ketimines, N-methyl morpholine, tin octoate, stannic chloride, butyl tin trichloride, dibutyl tin diacetate, dibutyl tin dilaurate, bis(2-ethylhexyl) tin oxide, 1,3-diacetoxy tetrabutyl stannoxate, dibutyl dibutoxy tin, lead naphthenate, bismuth trichloride, bismuth octoate, tetrabis (2-ethylhexyl)titanate, tetrabutoxy titanium, stannous octoate, manganese, zirconium, cobalt, lead, bismuth stannate, lead stannate, zirconium octoate, tin, dibutyl tin maleate, stannous oxalate, stannous stearate, barium nitrate, zinc nitrate, dibutyltin dilauryl mercaptide, bismuth stearate, lead stearate, dimethyltin dichloride, stannous naphthate, dibutyltin bis-O-phenylphenate, dibutyltin S,S-dibutyldithio-carbonate, and triphenylantimony dichloride. Organometallic catalysts having tin as the metal are preferred. Of these, dibutyltin dilaurate is most preferred.

If employed, the catalyst is usually present in an amount ranging from between about 0.1 to about 5 weight percent, and preferably, from between about 0.5 to about 2 weight percent. These weight percentages are based upon the total weight of the resin solids in the coating composition.

In addition to the above, optional ingredients, such as plasticizers, flow controllers, anti-oxidants, UV light absorbers and other similar additives known in the art, can also be included in the coating composition. If employed, the cumulative weight of these optional ingredients are typically present at up to about 25 weight percent. This weight percentage is based upon the total weight of the resin solids in the coating composition.

The crosslinkable film-forming coating composition of the present invention can be used as the clear top coat layer in a "color-plus-clear" coating system. The base coat in a color-plus-clear system encompassed by the present invention can be any of the compositions useful in coatings applications, particularly those in automotive and general industrial applications. The film-forming composition of the base coat typically includes a resinous binder and a pigment. Examples of particularly useful resinous binders include acrylic polymers, polyesters (including alkyds) and polyurethanes.

The base coat compositions may be solvent-borne or water-borne. Examples of water-borne base coats in a color-plus-clear system encompassed by the present invention are disclosed in U.S. Pat. No. 4,403,003. Moreover, water-borne polyurethanes, such as those disclosed in U.S. Pat. No. 4,147,679, can also be used as the resinous binder in the base coat to prepare a coating-plus-clear system which is encompassed by the present invention. Further, water-borne coatings, such as those described in U.S. Pat. No. 5,071,904, can also be used as a base coat.

Base coats also often contain pigments in order to give them the desired color. Moreover, base coat compositions containing metallic flake pigmentation are often used in the production of so-called "glamour metallic" finishes. These types of finishes are mainly used in the automotive industry. Examples of metallic flakes which can be used in a base coat of a color-plus-clear system encompassed by this invention include: aluminum flake, copper bronze flake and metal oxide coated mica.

Besides the metallic pigments, the base coat compositions may also contain non-metallic color pigments conventionally used in surface coatings. Examples of such pigments include: inorganic pigments such as titanium dioxide, iron oxide, chromium oxide, lead chromate, and carbon black, and organic pigments such as phthalocyanine blue and phthalocyanine green.

In general, non-metallic pigments are typically incorporated into the base coat composition in an amount ranging from between about 1 to about 80 percent by weight based on the total weight of coating solids. On the other hand, metallic pigments are typically employed in an amount ranging from between about 0.5 to 25 percent by weight based on the total weight of coating solids.

If desired, the base coat composition may contain additional materials well known in the art of formulated surface coatings. Examples of such additional materials include: surfactants, flow control agents, thixotropic agents, fillers, anti-gassing agents, organic co-solvents, catalysts, and other customary auxiliaries. If employed, the cumulative weight of these materials can constitute up to 40 percent by weight of the total weight of the coating composition.

The base coat compositions of a color-plus-clear system encompassed by the present invention can be applied to various substrates such as metals, plastics, wood, glass, woven fibers, non-woven fibers, foams, or a combination thereof. They are, however, particularly useful when applied over metals and elastomeric substrates that are found on motor vehicles.

Moreover, the base coat compositions can be applied over such substrates by conventional means including brushing, dipping, flow coating, spraying and the like. Most often, the base coat composition is applied by spraying. Conventional spray techniques and equipment for air spraying and electrostatic spraying and either manual or automatic methods can be used.

During application of the base coat composition to the substrate, a film of the base coat is formed on the substrate. Typically, the base coat thickness ranges from between about 0.01 to about 10 mils, and preferably, from between about 0.05 to about 5 mils, and even more preferably, from between about 0.1 to about 2 mils.

After application of the base coat to the substrate, a film is formed on the surface of the substrate by driving solvent out of the base coat by heating or by an air drying period. Preferably, the drying period is only for that time which is sufficient to ensure that the clear top coat can be applied over the base coat without the top coat dissolving the base coat. Suitable drying conditions will depend, in part, upon the particular base coat composition, the ambient humidity, and the like. In general, a drying time of from about 1 to about 5 minutes, at a temperature of about 68°–250° F. (20°–121° C.), will be adequate to ensure that mixing or "soak-in" of the two coats is minimized. At the same time, however, the base coat film is adequately wetted by the clear top coat composition so that satisfactory intercoat adhesion is obtained.

More than one base coat and/or top coat may be applied to develop the optimum appearance of a color-plus-clear system encompassed by the present invention. Usually, the previously applied coat is flashed (i.e., exposed to ambient conditions for about 1 to 20 minutes) between coats.

The clear top coat composition can be applied over the base coat film by any conventional coating technique. Examples of such conventional techniques include: brushing, dipping, flow coating, spraying and the like. Most often, the top coat is applied by spraying. Conventional spray techniques and equipment for air spraying and electrostatic spraying and either manual or automatic methods can be used.

After application of the top coat over the base coat, the coated substrate is heated to cure the coating layers. In the curing operation, solvents are driven off and the film-forming materials of the clear coat and the base coat are each crosslinked. The heating or curing operation is usually carried out at a temperature of about 160°–350° F. (71°–177° C.). If needed, however, lower or higher temperatures may be used as necessary to activate crosslinking mechanisms. The thickness of the clear coat layer usually ranges from between about 0.1 to about 10 mils, preferably, from between about 0.5 to about 7 mils, and even more preferably, from between about 1 to about 5 mils.

EXAMPLES

The examples which follow are intended to assist in a further understanding of this invention. Particular materials employed, species and conditions are intended to be illustrative of specific embodiments of the invention.

EXAMPLE 1

The following initial charge and feeds were used in the preparation of cyclohexyl methacrylate containing acrylic resin by solution polymerization technique in xylene.

| Ingredients | Parts by Weight |
|---|---|
| Initial Charge | |
| Xylene | 540.0 |
| Feed A | |
| Cyclohexyl methacrylate | 1559.4 |
| 2-Hydroxybutyl acrylate | 240.6 |
| Feed B | |
| Xylene | 540.0 |
| VAZO ® 67[1] | 90.0 |

[1]2,2'-azobis (2-methylbutanenitrile), available from E. I. du Pont deNemours and Company.

The initial charge was heated in a reaction vessel with agitation to reflux temperature (138° C.). At reflux Feeds A and B were initiated simultaneously and continued in a substantially continuous manner over a period of 3 hours while maintaining the reaction mixture at reflux temperature. At the completion of Feeds A and B, the reaction mixture was held for 2 hours at reflux temperature to complete the polymerization. The reaction mixture was cooled and filtered. The resultant acrylic resin had a total solids content of 61.0 percent determined at 110° C. for one hour and number average molecular weight (Mn) of 2074 as determined by gel permeation chromatography (GPC) using polystyrene as standard. The resin had a Gardner-Holdt viscosity measured at 25° C. of P+.

EXAMPLES 2–12

The free radical addition polymers containing various amount of cyclohexyl methacrylate and hydroxyl functional monomers were prepared similar to Example 1 and their composition, solvent, solids content, Gardner-Holdt viscosity and number average molecular weight are tabulated in Table I.

| Ingredients | Parts by Weight |
|---|---|
| Initial Charge | |
| AROMATIC ®-100[1] | 600.0 |
| Feed A | |
| n-Butyl acrylate | 300.0 |
| Ethyl acrylate | 320.0 |
| 2-Hydroxypropyl acrylate | 320.0 |
| Acrylic acid | 10.0 |
| Styrene | 50.0 |
| Feed B | |
| AROMATIC ®-100 | 65.0 |
| Di-tert-butyl peroxide | 48.0 |

[1]Aromatic hydrocarbon blend, available from Exxon Chemical Company.

The initial charge was heated in a reaction vessel with agitation to reflux temperature (163° C.). At reflux, Feeds A and B were initiated simultaneously and continued in a substantially continuous manner. The monomer mixture (Feed A) was added over a period of 4 hours and the initiator solution (Feed B) was added over 4.5 hours while maintaining the reaction mixture at reflux temperature. At the completion of Feeds A and B, the reaction mixture was held for 1 hour at reflux temperature to complete the polymerization. The reaction mixture was cooled and filtered. The resultant acrylic resin had a total solids content of 61.9 percent determined at 110° C. for one hour and number average molecular weight of 2092 as determined by gel permeation chromatography using polystyrene as a standard. The resin had a Gardner-Holdt viscosity measured at 25° C. of I-.

COMPARATIVE EXAMPLE 14

For the purpose of comparison, a hydroxy functional polymer was prepared in accordance with Example III.1 of U.S. Pat. No. 4,565,730. That polymer was prepared as follows:

TABLE I

| Ingredients | 1 | 2 | 3 | 4 | 5 | 6 | 7 | 8 | 9 | 10 | 11 | 12 |
|---|---|---|---|---|---|---|---|---|---|---|---|---|
| CHMA[1] | 1559.4 | 433.2 | 559.9 | 559.9 | 1800.0 | 552.0 | 540.0 | 1055.2 | 396.0 | 263.9 | 198.0 | 132.0 |
| 2-HBA[2] | 240.6 | 66.8 | 40.1 | 40.1 | 600.0 | — | — | — | — | — | — | — |
| 2-HPA[3] | — | — | — | — | — | 48.0 | 60.0 | 144.8 | 72.3 | 72.3 | 72.3 | 72.3 |
| MMA[4] | — | — | — | — | — | — | — | — | 65.9 | 131.9 | 164.9 | 197.9 |
| n-BA[5] | — | — | — | — | — | — | — | — | 65.9 | 131.9 | 164.8 | 197.8 |
| VAZO ® -67 | 90.0 | 25.0 | 30.0 | 30.0 | 120.0 | 30.0 | 30.0 | 60.0 | 30.0 | 30.0 | 30.0 | 30.0 |
| Solvent[6] | XYL | EtAc | XYL | EtAc | XYL | XYL | XYL | XYL | XYL | XYL | XYL | XYL |
| Solids (%) | 61.0 | 52.0 | 58.1 | 66.7 | 63.0 | 62.4 | 61.1 | 62.3 | 60.9 | 58.2 | 64.2 | 57.7 |
| Viscosity[7] | P+ | R | I | Z6+ | O+ | U– | R– | T | N | I+ | Q | F |
| Mn | 2074 | 7471 | 1574 | 7788 | 2035 | 2197 | 2737 | 1910 | 2311 | 2322 | 2696 | 2397 |

[1]Cyclohexyl methacrylate
[2]2-Hydroxybutyl acrylate
[3]2-Hydroxypropyl acrylate
[4]Methyl methacrylate
[5]n-Butyl acrylate
[6]XYL: xylene; EtAc:ethyl acetate
[7]Gardner-Holdt at 25° C.

COMPARATIVE EXAMPLE 13

For the purpose of comparing the properties of compositions which contain cyclohexyl methacrylate with those that do not, a hydroxy functional polymer was prepared in accordance with Example II.1 of U.S. Pat. No. 4,565,730. That polymer was prepared as follows:

| Ingredients | Parts by Weight |
|---|---|
| Initial Charge | |
| Xylene | 300.0 |

-continued

| Ingredients | Parts by Weight |
| --- | --- |
| n-Butyl acetate | 300.0 |
| Feed A | |
| 2-Ethylhexyl methacrylate | 150.0 |
| Methyl methacrylate | 345.0 |
| Hydroxyethyl methacrylate | 100.0 |
| 2-Hydroxypropyl methacrylate | 150.0 |
| Methacrylic acid | 5.0 |
| n-Butyl acrylate | 100.0 |
| Styrene | 150.0 |
| Feed B | |
| Xylene | 65.0 |
| Di-tert-butyl peroxide | 48.0 |

The initial charge was heated in a reaction vessel with agitation to reflux temperature (131° C.). At reflux, Feeds A and B were initiated simultaneously and continued in a substantially continuous manner. The monomer mixture (Feed A) was added over a period of 4 hours and the initiator solution (Feed B) was added over 4.5 hours while maintaining the reaction mixture at reflux temperature. At the completion of Feeds A and B, the reaction mixture was held for 1 hour at reflux temperature to complete the polymerization. The reaction mixture was cooled and filtered. The resultant acrylic resin had a total solids content of 60.8 percent determined at 110° C. for one hour and number average molecular weight of 12787 as determined by gel permeation chromatography using polystyrene as a standard. The resin had a Gardner-Holdt viscosity measured at 25° C. of Z7-.

EXAMPLE 15

A pigmented black base coating composition was used which is a high-solids polyester base coating composition available from PPG Industries, Inc. as POLYCRON® III base coat.

EXAMPLE 16

A clear film forming composition was formulated from the following ingredients:

| Ingredients | Parts by Weight | Solids |
| --- | --- | --- |
| Acrylic resin of Example 1 | 229.78 | 140.17 |
| DESMODUR ® BL 3175A[1] | 52.98 | 39.74 |
| Xylene | 12.49 | — |
| n-Butyl acetate | 12.49 | — |
| n-Butanol | 6.25 | — |
| TINUVIN ® 328[2] | 14.28 | 4.28 |
| TINUVIN ® 292[3] | 2.25 | 1.11 |
| Dibutyltin dilaurate | 0.93 | 0.93 |

[1]Methyl ethyl ketoxime blocked 1,6-hexamethylene diisocyanate available from BAYER Corp. in AROMATIC ®-100 available from Exxon Chemical Company.
[2]2-(2'-Hydroxy-3',5'-ditert-amylphenyl) benzotriazoale UV light stabilizer available from Ciba Geigy Corp. (dissolved in xylene).
[3]Bis(1,2,2,6,6-pentamethyl-4-piperidinyl) sebacate hindered amine stabilizer available from Ciba Geigy Corp. (dissolved in isobutanol after neutralization with dodecylbenzene sulfonic acid).

EXAMPLES 17–27

The clear coating compositions containing copolymers of cyclohexyl methacrylate and hydroxyl functional monomers were formulated similar to Example 16 and their compositions in solid grams are tabulated in Table II.

TABLE II

| Ingredients | 16 | 17 | 18 | 19 | 20 | 21 | 22 | 23 | 24 | 25 | 26 | 27 |
| --- | --- | --- | --- | --- | --- | --- | --- | --- | --- | --- | --- | --- |
| DESMODUR ® BL 3175 A | 39.74 | 37.57 | 21.28 | 20.99 | 62.85 | 27.55 | 34.42 | 39.31 | 39.66 | 38.19 | 39.71 | 40.14 |
| Resin from Example 1 | 140.17 | — | — | — | — | — | — | — | — | — | — | — |
| Resin from Example 2 | — | 132.57 | — | — | — | — | — | — | — | — | — | — |
| Resin from Example 3 | — | — | 150.29 | — | — | — | — | — | — | — | — | — |
| Resin from Example 4 | — | — | — | 148.21 | — | — | — | — | — | — | — | — |
| Resin from Example 5 | — | — | — | — | 118.79 | — | — | — | — | — | — | — |
| Resin from Example 6 | — | — | — | — | — | 146.50 | — | — | — | — | — | — |
| Resin from Example 7 | — | — | — | — | — | — | 146.20 | — | — | — | — | — |
| Resin from Example 8 | — | — | — | — | — | — | — | 138.67 | — | — | — | — |
| Resin from Example 9 | — | — | — | — | — | — | — | — | 139.87 | — | — | — |
| Resin from Example 10 | — | — | — | — | — | — | — | — | — | 134.73 | — | — |
| Resin from Example 11 | — | — | — | — | — | — | — | — | — | — | 140.04 | — |
| Resin from Example 12 | — | — | — | — | — | — | — | — | — | — | — | 141.57 |
| TINUVIN ® 328 | 4.28 | 4.05 | 4.09 | 4.04 | 4.32 | 4.15 | 4.30 | 4.24 | 4.28 | 4.12 | 4.28 | 4.33 |
| TINUVIN ® 292 | 1.11 | 1.06 | 1.06 | 1.05 | 1.12 | 1.08 | 1.12 | 1.11 | 1.11 | 1.08 | 1.12 | 1.12 |
| Dibutyltin dilaurate | 0.93 | 0.88 | 0.88 | 0.88 | 0.93 | 0.90 | 0.94 | 0.92 | 0.93 | 0.89 | 0.93 | 0.94 |

COMPARATIVE EXAMPLES 28–32

Comparative clear coating compositions containing DESMODUR® BL 3175A and hydroxyl functional polymers were formulated similar to Examples 16–27 using Comparative Examples 13–14 and commercially available fluorinated polyols. Their compositions in grams of resin solids are tabulated in Table III.

TABLE III

| INGREDIENTS | 28 | 29 | 30 | 31 | 32 |
| --- | --- | --- | --- | --- | --- |
| DESMODUR ® BL 3175A | 75.06 | 77.39 | 79.71 | 46.34 | 70.58 |
| Resin from Example 13 | 57.47 | 78.32 | 98.14 | — | — |
| Resin from Example 14 | 57.47 | 33.55 | 10.91 | — | — |
| LUMIFLON ® LF200[1] | — | — | — | 163.57 | — |
| LUMIFLON ® LF916[2] | — | — | — | — | 144.34 |
| TINUVIN ® 328 | 4.48 | 4.47 | 4.47 | 4.91 | 5.11 |

TABLE III-continued

| INGREDIENTS | 28 | 29 | 30 | 31 | 32 |
|---|---|---|---|---|---|
| TINUVIN ® 292 | 1.15 | 1.23 | 1.20 | 1.37 | 1.33 |
| Dibutyltin dilaurate | 0.80 | 0.78 | 0.76 | 0.82 | 0.88 |

[1]Fluoropolymer with hydroxyl number of 52 available from Asahi Glass Company, Ltd., Japan.
[2]Fluoropolymer with hydroxyl number of 90 available from Asahi Glass Company, Ltd., Japan.

The base coating composition prepared according to Example 15 was air-atomized spray applied to pretreated aluminum panels at room temperature to attain a dry film thickness of 0.8 to 1.2 mils. After a 10 minute flash, the panels were then baked for 10 minutes at 350° F. (177° C.). The panels were allowed to cool room temperature and the prepared clear coating compositions were applied to the base coating. The clear coatings of Examples 16 to 27 and Comparative Examples 28 to 32 were applied in four successive coats at room temperature with film ranges from 1.8 to 2.2 mils. Each panel was given a 10 minute flash at room temperature, 10 minute "force" flash at 150° F. (66° C.), and then baked for 30 minutes at 285° F. (141° C.).

The films were then evaluated for durability and acid etch resistance. The durability tests were done using Xenon arc Weather-Ometer with quartz/borosilicate filter combination from 340 nm. The cycle was: 40 minutes light; 20 minutes light with specimen spray; 60 minutes light; 60 minutes dark cycle with both specimen and rack spray. The results after 2000 hours exposure are tabulated in Table IV. The acid etch resistance of the films were evaluated via a 3-cycle sulfurous acid spray test. The acid solution with pH of 2 was prepared by adding 12 grains of $H_2SO_3$ to 350 grams of deionized water. The test consists of misting 3"×5" panel sections with the acid solution to completely cover the panels densely with droplets and then placing the panels in a 120° F. (49° C.) oven for 20 minutes. This constitutes one cycle. The procedure is then repeated two times. The panels are then washed with soap and water and towel dried for evaluation. The acid etch results are reported in Table IV.

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A film-forming coating composition comprising:
   (a) a hydroxyl-containing acrylic solution polymer which is the polymerization product of monomeric components consisting of:
      (i) a first monomeric component employed in an amount ranging from about 45 to about 95 weight percent, said weight percentages being based upon the total weight of all monomers used in preparing the hydroxyl-containing acrylic solution polymer, said first monomeric component is at least one compound selected from the group consisting of:
         a. cycloaliphatic esters of (meth)acrylic acid selected from the group consisting of t-butyl-cyclohexyl (meth)acrylate and cyclohexyl (meth)acrylate, and
         b. aromatic esters of (meth)acrylic acid, and
      (ii) a second monomeric component which consists of at least one hydroxyl functional acrylic monomer present in an amount such that the hydroxyl number of the resulting acrylic solution polymer is less than 60, and
   (b) a polyisocyanate crosslinking agent.

2. The composition of claim 1 wherein the first monomeric component consists of cyclohexyl methacrylate or a mixture of cyclohexyl methacrylate and at least one compound selected from the group consisting of: t-butyl-cyclohexyl(meth)acrylate, cyclohexyl acrylate and aromatic esters of (meth)acrylic acid.

3. The composition of claim 1 wherein the acrylic solution polymer has a hydroxyl number ranging from between about 25 to about 55.

4. The composition of claim 1 wherein the polyisocyanate crosslinking agent is present in an amount ranging from between about 10 to about 40 percent by weight, based on the total weight of resin solids.

5. The composition of claim 1 wherein said at least one hydroxyl functional acrylic monomer consists of at least one Table IV

| Clear Coat | % CHMA Content | Calculated OH Number on Solids | 2000 HOURS WEATHER-OMETER | | | Acid Etch[3] |
|---|---|---|---|---|---|---|
| | | | Initial Gloss | % Gloss Retention[2] | Remarks | |
| EX. 16 | 86.6 | 52 | 89 | 98 | No Spotting or etching | 9 |
| EX. 17 | 86.6 | 52 | 90 | 99 | Slight Spotting, no etching | 10 |
| EX. 18 | 93.3 | 26 | 91 | 96 | Etched, Slight Spotting | 8 |
| EX. 19 | 93.3 | 26 | 89 | 94 | Etched | 10 |
| EX. 20 | 75 | 97.4 | 91 | 96 | Slight Spotting, no etching | 10 |
| EX. 21 | 92 | 34.5 | 88 | 94 | Slight Spotting, no etching | 10 |
| EX. 22 | 90 | 43.2 | 90 | 97 | No Spotting, no etching | 10 |
| EX. 23 | 87.9 | 52 | 89 | 98 | Slight Spotting, no etching | 9 |
| EX. 24 | 66 | 52 | 91 | 96 | Slight Spotting, no etching | 7–8 |
| EX. 25 | 44 | 52 | 89 | 85 | Spotting, no etching | 7 |
| EX. 26 | 33 | 52 | 88 | 78 | Spotting, no etching | 8 |
| EX. 27 | 22 | 52 | 88 | 61 | Spotting, no etching | 4–5 |
| EX. 28 | 0 | 120 | 91 | 85 | Spotting, no etching | 4–5 |
| EX. 29 | 0 | 129 | 91 | 70 | Spotting, no etching | 4 |
| EX. 30 | 0 | 134 | 88 | 76 | Spotting, no etching | 3–4 |
| EX. 31 | 0 | 52 | 83 | 96 | No Spotting or etching | 10 |
| EX. 32 | 0 | 90 | 87 | 92 | No Spotting or etching | 9 |

[1]Measured with a GLOSSGARD ® RII glossmeter at 60°.
[2]Measured final gloss/measured initial gloss multiolied by 1OO.
[3]Rating scale: 10 = no acid etch and 0 = severe acid etch.

compound selected from the group consisting of: 2-hydroxybutyl acrylate and 2-hydroxypropyl acrylate.

6. The composition of claim 1 wherein the acrylic solution polymer has a number average molecular weight of 1,500 to 20,000.

7. The composition of claim 1 wherein the polyisocyanate crosslinking agent is blocked.

8. The composition of claim 1 wherein the first monomeric component consists of t-butyl-cyclohexyl (meth) acrylate or a mixture of t-butyl-cyclohexyl(meth)acrylate and at least one compound selected from the group consisting of: cyclohexyl(meth)acrylate and aromatic esters of (meth)acrylic acid.

9. The composition of claim 5 wherein said at least one hydroxyl functional acrylic monomer consists of 2-hydroxybutyl acrylate.

10. A film-forming coating composition comprising:
 (a) a hydroxyl-containing acrylic solution polymer which is the polymerization product of monomeric components consisting of:
  (i) a first monomeric component employed in an amount ranging from about 45 to about 95 weight percent, said weight percentages being based upon the total weight of all monomers used in preparing the hydroxyl-containing acrylic solution polymer, said first monomeric component is at least one compound selected from the group consisting of:
   a. cycloaliphatic esters of (meth)acrylic acid selected from the group consisting of t-butyl-cyclohexyl (meth)acrylate and cyclohexyl (meth)acrylate, and
   b. aromatic esters of (meth)acrylic acid,
  (ii) a second monomeric component employed in an amount up to about 45 weight percent, said weight percentage being based upon the total weight of all monomers used in preparing the hydroxyl-containing acrylic solution polymer, said second monomeric component is at least one compound selected from the group consisting of: vinyl aromatic compounds, and alkyl (meth)acrylates containing from 1 to 8 carbon atoms in the alkyl group, and
  (iii) a third monomeric component which consists of at least one hydroxyl functional acrylic monomer present in an amount such that the hydroxyl number of the resulting acrylic solution polymer is less than 60, and
 (b) a polyisocyanate crosslinking agent.

11. The composition of claim 10 wherein the first monomeric component consists of cyclohexyl methacrylate or a mixture of cyclohexyl methacrylate and at least one compound selected from the group consisting of: t-butyl-cyclohexyl(meth)acrylate, cyclohexyl acrylate and aromatic esters of (meth)acrylic acid.

12. The composition of claim 10 wherein the acrylic solution polymer has a hydroxyl number ranging from between about 25 to about 55.

13. The composition of claim 10 wherein the polyisocyanate crosslinking agent is present in an amount ranging from between about 10 to about 40 percent by weight, based on the total weight of resin solids.

14. The composition of claim 10 wherein said at least one hydroxyl functional acrylic monomer consists of at least one compound selected from the group consisting of: 2-hydroxybutyl acrylate and 2-hydroxypropyl acrylate.

15. The composition of claim 10 wherein the acrylic solution polymer has a number average molecular weight of 1,500 to 20,000.

16. The composition of claim 10 wherein the polyisocyanate crosslinking agent is blocked.

17. The composition of claim 10 wherein the second monomeric component is at least one vinyl aromatic compound, and wherein said at least one vinyl aromatic compound consists of selected from the group consisting of styrene and vinyl toluene.

18. The composition of claim 17 wherein the second monomeric component consists of styrene.

19. The composition of claim 10 wherein the second monomeric component consists of at least one alkyl (meth) acrylate containing from 1 to 8 carbon atoms in the alkyl group, and wherein said at least one alkyl (meth)acrylate consists of selected from the group consisting of: methyl methacrylate, ethyl (meth)acrylate, n-butyl (meth)acrylate and 2-ethylhexyl acrylate.

20. The composition of claim 19 wherein the second monomeric component consists of a mixture of n-butyl (meth)acrylate and methyl methacrylate.

* * * * *